June 27, 1967 C. S. HASSELHOFF 3,327,845

STRAP FOR CARRYING CONTAINERS

Filed April 26, 1965 6 Sheets-Sheet 1

INVENTOR
CARL S. HASSELHOFF

BY [signature]

ATTORNEY

STRAP FOR CARRYING CONTAINERS

Filed April 26, 1965

INVENTOR
CARL S. HASSELHOFF

BY Irvin V. Glenn
ATTORNEY

June 27, 1967 C. S. HASSELHOFF 3,327,845

STRAP FOR CARRYING CONTAINERS

Filed April 26, 1965 6 Sheets-Sheet 3

INVENTOR
CARL S. HASSELHOFF

BY [signature]

ATTORNEY

INVENTOR
CARL S. HASSELHOFF

BY [signature]

ATTORNEY

INVENTOR
CARL S. HASSELHOFF

BY [signature]

ATTORNEY

INVENTOR.
CARL S. HASSELHOFF
BY [signature]
and
[signature]
ATTORNEYS

United States Patent Office 3,327,845 Patented June 27, 1967

3,327,845
STRAP FOR CARRYING CONTAINERS

Carl S. Hasselhoff, Glenn Gardens, Md., assignor to The Mead Corporation, Dayton, Ohio, a corporation of Ohio Filed Apr. 26, 1965, Ser. No. 454,764
4 Claims. (Cl. 206—65)

This application is a continuation-in-part of co-pending application, Ser. No. 228,314, filed Oct. 4, 1962, now abandoned.

This invention relates to carrying means and, more particularly, to an improved strap means for carrying containers and the like.

Generally, there is provided a sheet of laminated paperboard or equivalent relatively stiff bendable sheet material scored medially to define a pair of panels foldable into coextensive parallel arrangement and hingedly interconnected along one or more of fold lines defined by the scoring. Each panel is provided with a row of circular apertures which snugly receive tapered containers therein. The containers are outwardly stepped or flanged adjacent their rims to seat on the edges of the apertures in each panel so that when the panels are swung into parallelism, the closures of the containers held in one panel engage those in the other panel to mutually prevent displacement. The free edges of the panels desirably have interlocking tongues and slots for detachably holding the panels in coextensive parallelism.

It is a principal object of the present invention to provide a holder and carrier for containers of simple, economical yet highly effective design.

It is another object of the invention to provide a device of the character described formed from a single piece of die cut and scored sheet material.

It is a further object of the invention to provide a carrier for plastic containers and the like in which a pair of opposed panels hold rows of containers positioned for firmly holding the closures therefor and to hold the containers seated in apertures in the panels.

It is still another object of the invention to provide a carrier for containers having opposed container-holding panels detachably locked in parallelism by mating tongues and slots associated with the panels.

Other and further objects of the invention will become apparent from a reading of the following specification taken in conjunction with the drawings, in which.

Referring to FIGURES 1 through 6 of the drawings, numerals 20 and 21 generally designate, respectively, a foldable blank and a holder and a carrier formed by folding the blank. Blank 20 is a single piece of stiff but bendable board, as, for example, paperboard, corrugated board, laminated paper board, cardboard and the like, preferably die cut and scored in a single operation.

A relatively deep and wide longitudinally and medially extending score line defines a hinge 22 interconnecting two panels 23 and 24 of equal sizes and shapes.

Figure 1:
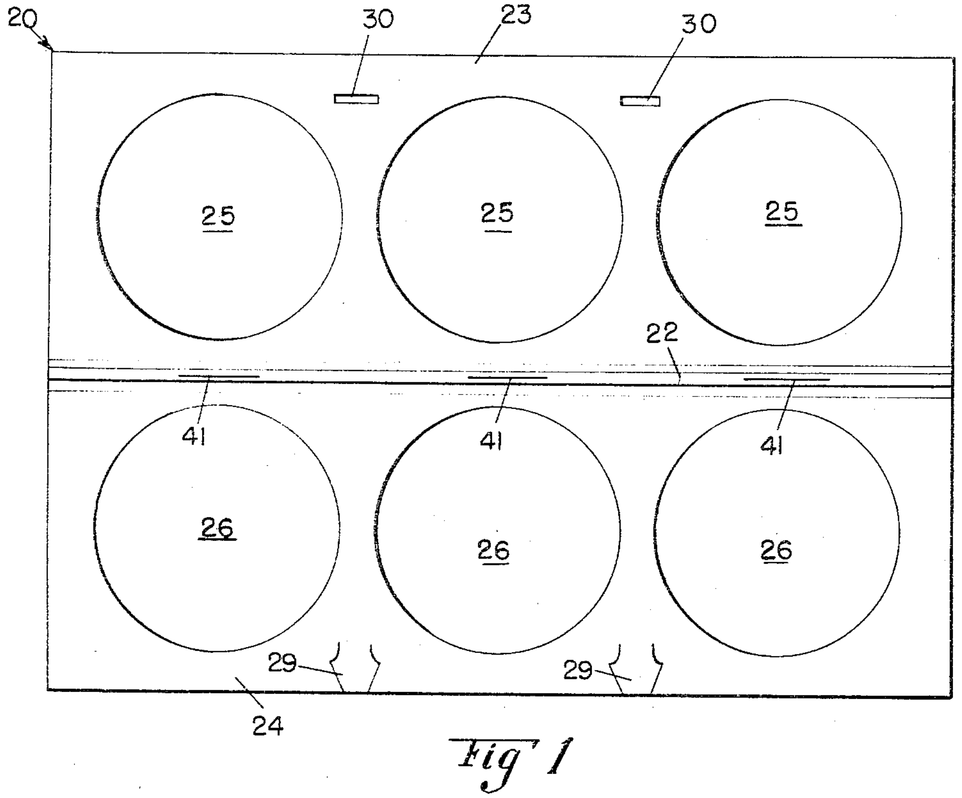
FIGURE 1 is a plan view of a preferred holder blank in its initial unfolded condition.
Figure 2:
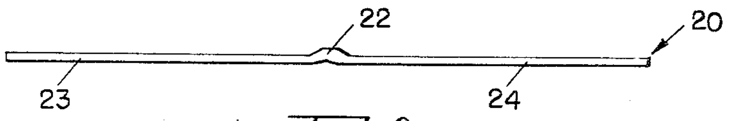
FIGURE 2 is an end elevational view of the blank of FIGURE 1.
Figure 3:
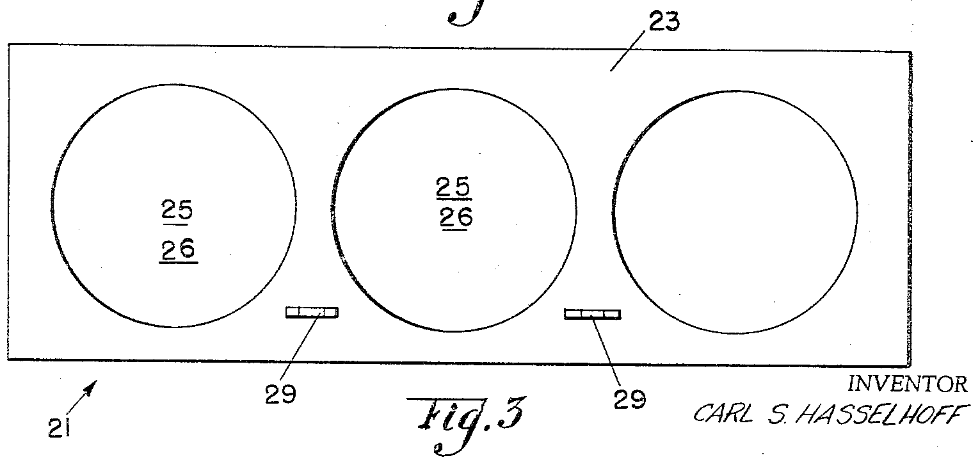
FIGURE 3 is a plan view of the holder of FIGURE 1 folded and interlocked (the containers being omitted for clarity of the showing)
Figure 6:
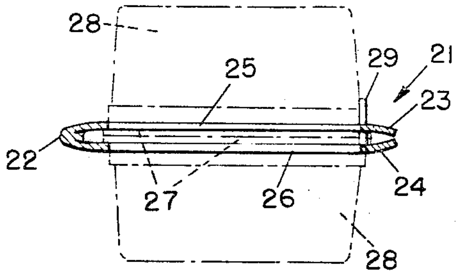
FIGURE 6 is an end elevational view of the showing of FIGURE 5 in section taken on line 6—6 of FIGURE 5.
Figure 7:
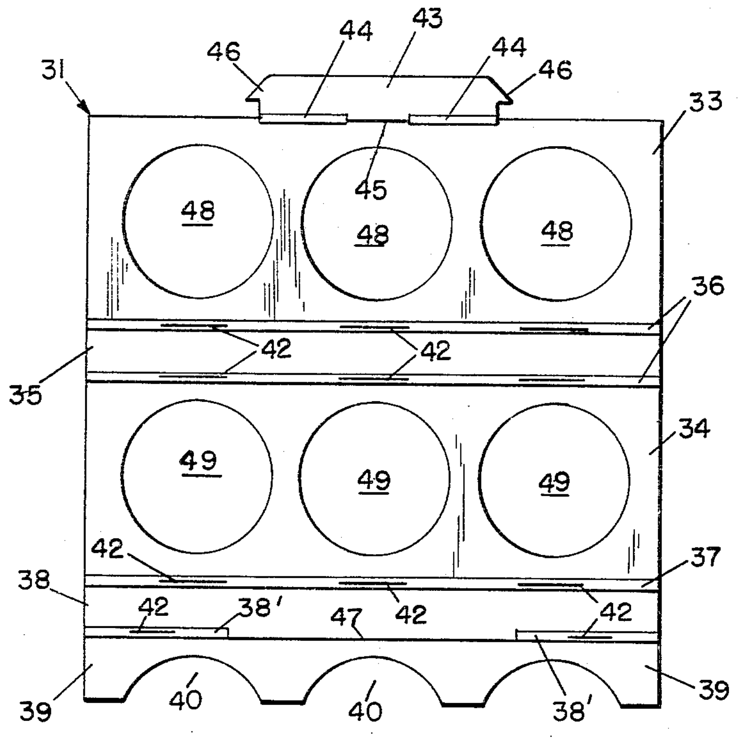
FIGURE 7 is a plan view of a modified form of holder blank.
Figure 8:
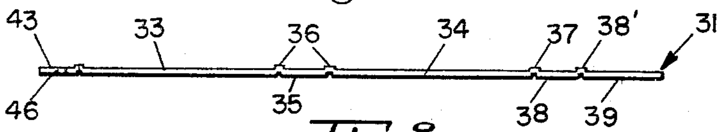
FIGURE 8 is an end elevational view of the blank of FIGURE 7.
Figure 9:
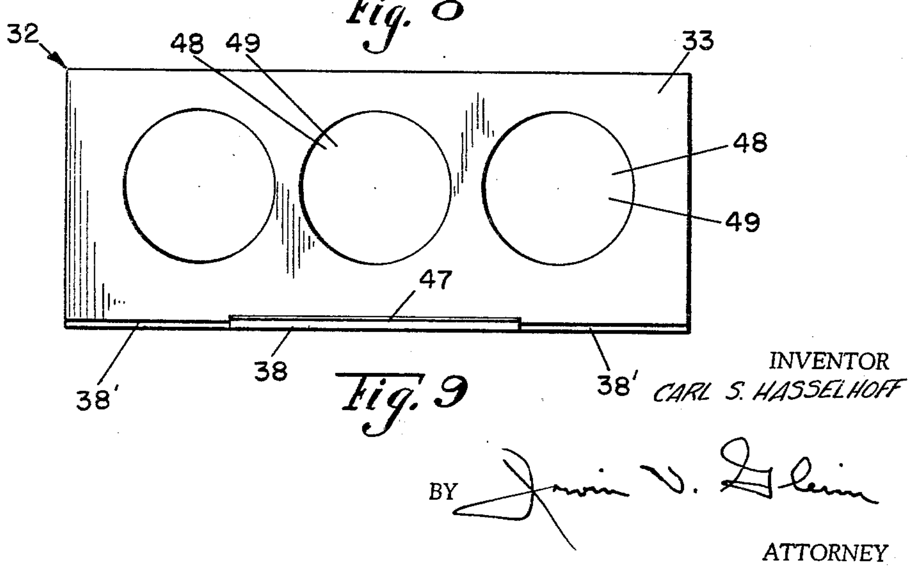
FIGURE 9 is a plan view of the blank of FIGURES 7 and 8 folded and interlocked to provide a holder and carrier for six containers.

Panel 23 has a row of equally spaced circular apertures 25 die-cut therein while panel 24 has a matching row of apertures 26 of the same sizes and shapes positioned to be coaxially aligned with apertures 25 when the holder and carrier panels 23 and 24 are folded into parallelism, FIGURES 3 and 6, in which positions they cause closure rims 27 of containers 28 to coaxially abut. Rims 27 engage over the edges of apertures 25 and 26 to prevent outward displacement of containers 28 through said apertures, into which they are inserted before the panels are folded over each other. While containers 28 are disclosed as being of circular transaxial cross sections, it is obvious that they, accordingly also their embracing apertures, could have oval or rectangular polygonal cross sections, if desired.

Figure 4:
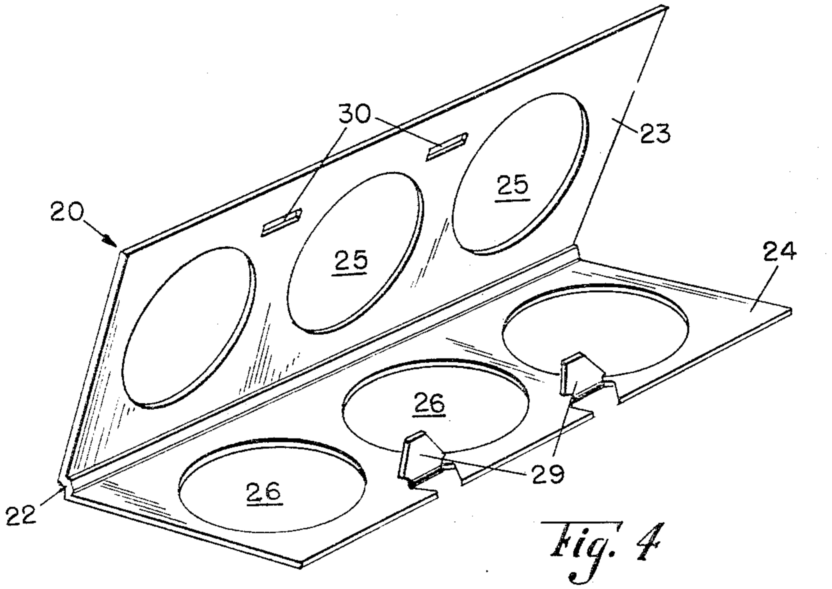
FIGURE 4 is a perspective view of the holder of FIGURE 3 in its half closed condition.
Figure 5:
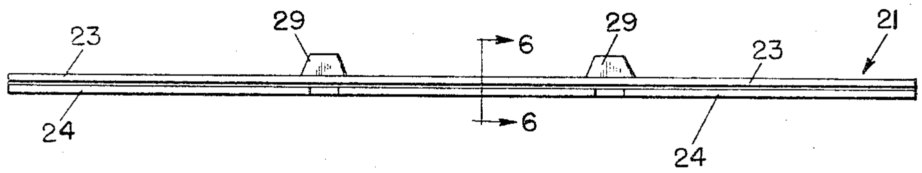
FIGURE 5 is a front elevational view of the closed holder of FIGURE 3.

Panel 24 has a pair of arrowhead-shaped tongues 29 die cut therein and bendable, as shown in FIGURES 4, 5 and 6, to extend through mating aligned slots 30 cut in panel 24 to detachably interconnect the free edges of folded panels 23 and 24, as shown in FIGURE 6. However, the free edges of panels 23 and 24 could, if preferred, be interconnected by strips of adhesive tape or by U-shaped clips bent or slipped over said edges, or by other known types of fasteners.

In the modified holder and carrier of FIGURES 7–12, numerals 31 and 32, respectively, generally designate the assembled device and a single blank foldable to produce the holder and carrier. Blank 32 has a pair of parallel panels 33 and 34 spaced from each other and interconnected by a narrow bridging panel or strip 35 joined along its parallel edges to the contiguous edges of panels 33 and 34 by integral hinge portions 36 defining score lines.

Figure 10:
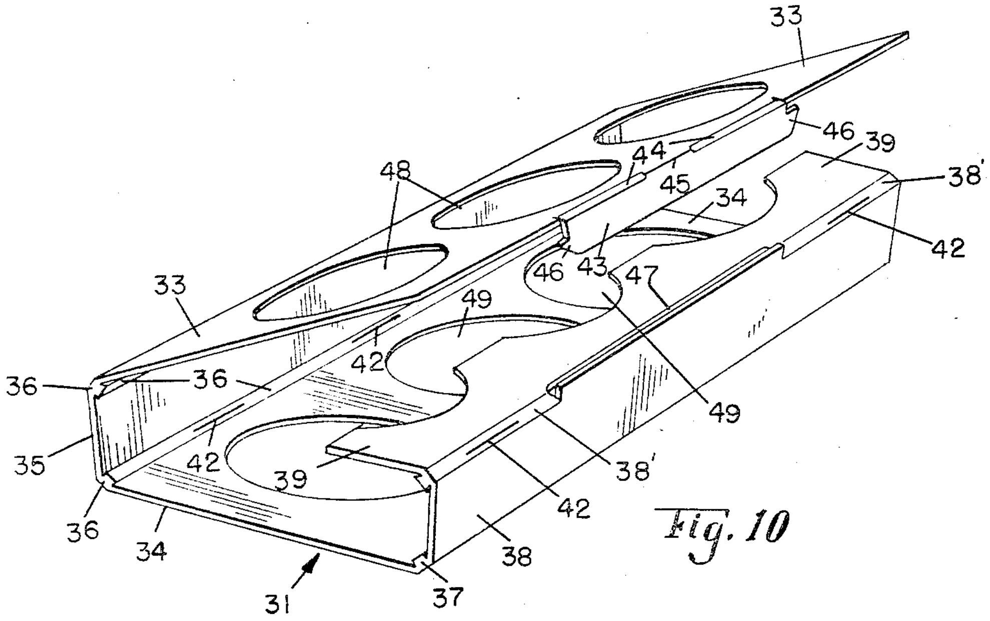
FIGURE 10 is a perspective view of the device of FIGURE 9 with the parts thereof partly separated.
Figure 11:
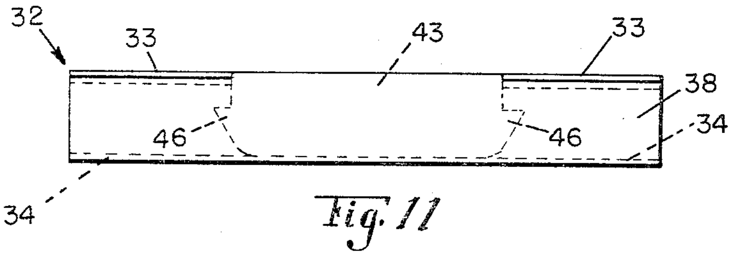
FIGURE 11 is a front elevational view of the showing of FIGURE 9.

The forward edge of panel 34, FIGURE 10, has similarly attached thereto by and along scored hinge 36 another bridging strip 38. The upper edge spacing and bridging strip 38 has hingedly joined thereto at 38', an inwardly foldable strip 39 arcuately notched at 40 to embrace the contiguous side walls of containers 41 to be held in carrier 31. Scored hinges 36, 37, and 38' may be provided medially with one or more longitudinally extending slits 42 for the purpose of increasing their flexibility.

The free edge of panel 33 has centrally formed thereon an integral fastening flap 43 bendable about a score line hinge 44 medially and longitudinally slit at 45 for increased flexibility. The ends of flap 43 have barb-like ears 46 which cam past and retainingly hook under the ends of slot 47 extending between and aligned with two hinge sections 38'.

Figure 12:
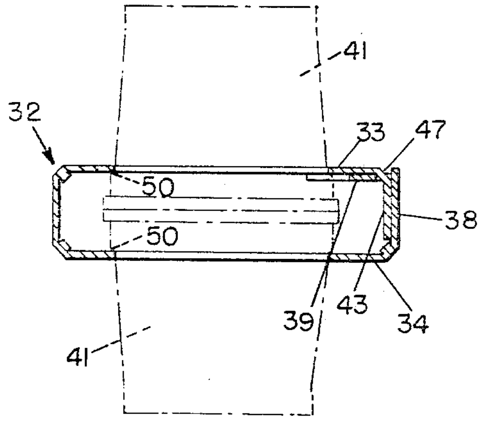
FIGURE 12 is an end elevational view of the disclosure of FIGURE 11, in section, taken on line 12—12 of FIGURE 11.

Panel 33 has a row of container receiving apertures 48 die cut therein, each aperture being coaxially aligned with a similar aperture 49 in panel 34 so that the open larger ends of containers 41 held in said apertures will abut to mutually hold there on closure caps or discs, not shown but of conventional construction. Containers 41 have stepped upper walls forming annular seats 50 which engage against the rims of apertures 48 and 49 to prevent outward displacement of containers 41 through said apertures. If desired, seats 50 may be omitted and, as best shown in FIGURE 12, the outer wall surface of frusto-conical container 41 engages the walls of panel 34 provided by openings 49 and the upper edge of the container, or its cover, engages panel 33. Thus, the upper openings 48 may be employed for display or stacking purposes as illustrated in FIGURE 16, or if desired, may be omitted for economical reasons or for the reasons set forth in connection with the embodiment illustrated in FIGURE 17.

Figure 13:
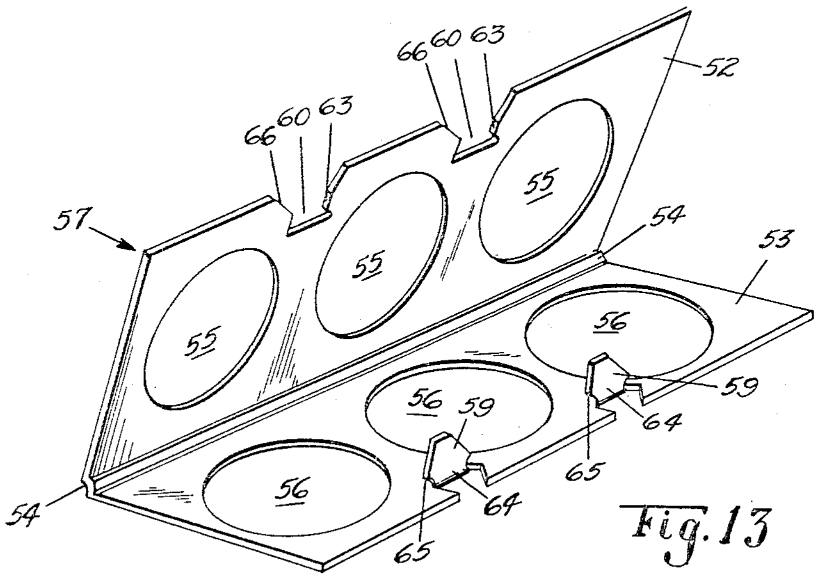
FIGURE 13 is a perspective view of a further modification of the invention.
Figure 14:
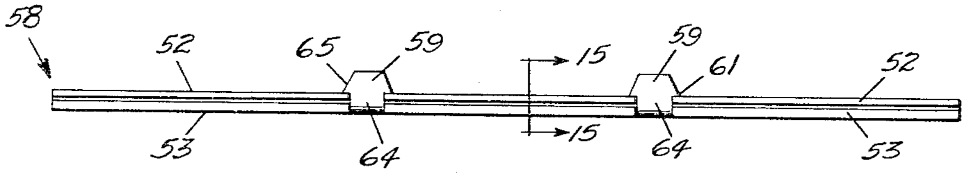
FIGURE 14 is a front elevational view of the holder of FIGURE 13 in closed and interlocked condition.
Figure 15:
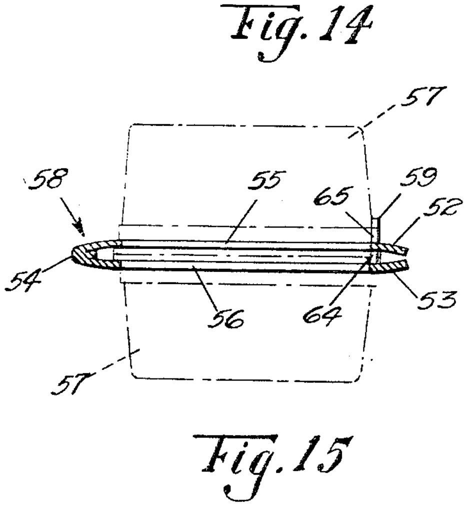
FIGURE 15 is an end elevational view of the showing of FIGURE 14 in section on line 15—15 of FIGURE 14.

In the species of FIGURES 13, 14, 15, blank 51, generally similar to blank 20 of FIGURE 4, has a pair of panels 52, 53 interconnected along scored hinge 54 so as to be folded into the superimposed relative positions shown in FIGURES 14 and 15. Panels 52, 53 have rows of container receiving aperatures 55, 56, respectively, positioned for coaxial alignment of containers 57 held therein in the closed condition of the holder and carrier thus formed, FIGURES 14, 15, and generally designated 58.

Panel 53 has a plurality of arrowhead shaped tongues 59 die cut therein and bendable upwardly, as shown in FIGURE 13, to extend upwardly through mating notches 60 cut in the free edge of panel 52. The notches have inwardly directed detent fingers 63 which retainingly embrace the edges of the narrower bases 64 of tongues 59 beneath their barb-like lateral extensions 65. Notches 60 have outwardly flared mouths 66 which facilitate swinging of tongues 59 into and from interlocking engagement with notches 60. Said engagement and disengagement may be further facilitated by slightly twisting the tongues during the locking and unlocking operations.

Figure 16:
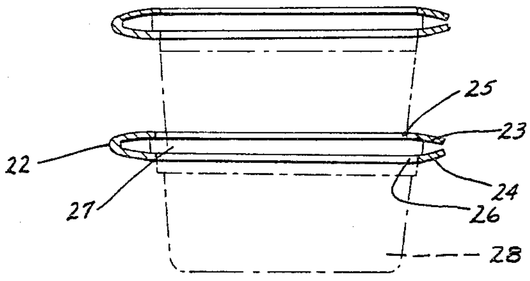
FIGURE 16 is a view similar to and a modification of the disclosures of FIGURES 6 and 15; and, FIGURE 17 is a view similar to and a modification of the disclosure of FIGURE 12.

In FIGURE 16 there is illustrated a modification of the embodiments illustrated in FIGURES 6 and 16. In the modification of FIGURE 16, a holder like that employed in FIGURE 6 and comprising panels 23, 24 may be employed or, alternatively, if desired, a holder comprising blank 51 and panels 52 and 53 like that illustrated in FIGURE 15 may be employed. In this embodiment, a single container or row of containers is retained with a portion of the container extending through openings 26 of panel 24, or through openings 56 of panel 53, as the case may be, and with the flanged or chimed edges of the container or containers retained by the top panel, either 23 or 52 as the case may be, folded into parallel contacting arrangement as illustrated. The upper openings, either 25 or 55 as the case may be, thus provide a convenient means for stacking additional containers for display or storage purposes. Additionally, the upper openings provide a means of displaying advertising material or other media printed on the container cover. In the event the stacking of display features are not required or desired, the upper openings, either 25 or 55, may be omitted thus providing additional economies in the manufacture of the carrier and holder.

Figure 17:
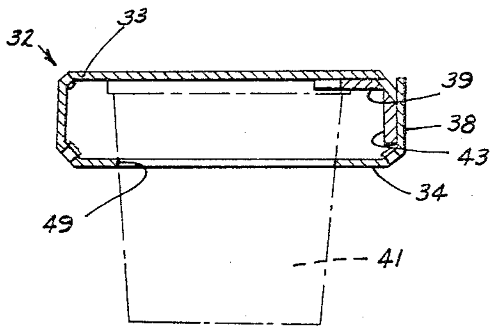

In the embodiment illustrated in FIGURE 17 which is similar to the one illustrated in FIGURES 7–12, a single frusto-conical container, or row of such containers, without chimes or flanges, such as tumblers, is illustrated retained in a carrier like 31 except that upper openings 48 have been omitted to provide a solid top panel to provide protection to the container which may be frangible.

While particular embodiments of the invention have been illustrated and described, it will be obvious to those skilled in the art that various changes and modifications may be made without departing from the invention and it is intended in the appended claims to cover all such changes and modifications that fall within the true spirit and scope of the invention.

What is claimed is:

1. A container package comprising a container having at one end thereof a rim portion of larger cross section than the opposite end thereof releasably secured within a holder and carrier comprising a blank of relatively stiff material with a score line dividing said material into a pair of oppositely disposed panels foldable along said line into overlying relation, at least one of said panels having therein an aperture of smaller cross section than said rim portion and receiving the opposite end of said container therethrough with said rim portion between said panels when said panels are in said overlying relation, and means readily detachably securing together the free edges of said panels for maintaining said container within said aperture.

2. A package in accordance with claim 1 wherein said aperture is provided in each of said panels and disposed for registry when said panels are in overlying relation.

3. A package according to claim 2 wherein said opposite end of each of a pair of containers is received through each of said apertures with the rim portions of said containers between said panels.

4. A package according to claim 2 wherein a plurality of containers are releasably secured within a plurality of apertures in each of said panels.

References Cited

UNITED STATES PATENTS

| | | | |
|---|---|---|---|
| 986,610 | 3/1911 | Waldvogel | 229—16 |
| 1,140,540 | 5/1915 | Smith. | |
| 1,816,542 | 7/1931 | Mellin. | |
| 1,944,214 | 1/1934 | Bueschel. | |
| 2,077,047 | 4/1937 | Kondolf. | |
| 2,513,762 | 7/1950 | Tyson. | |
| 2,547,716 | 4/1951 | Murphy | 229—28 |
| 2,646,202 | 7/1953 | Gibbons. | |
| 2,844,245 | 7/1958 | Gruber et al. | 229—45 X |
| 2,973,129 | 2/1961 | Stone et al. | 229—40 X |
| 3,084,842 | 4/1963 | Beech | 217—26.5 X |
| 3,139,981 | 7/1964 | Akeireb | 229—40 X |
| 3,166,190 | 1/1965 | Conrades. | |

FRANKLIN T. GARRETT, *Primary Examiner.*

GEORGE O. RALSTON, *Examiner.*